United States Patent [19]

Petschauer

[11] Patent Number: 5,407,875
[45] Date of Patent: Apr. 18, 1995

[54] SUPERDUTY FIRECLAY REFRACTORY BRICK AND METHODS FOR ITS MANUFACTURE

[75] Inventor: Hans Petschauer, Grossalmerode, Germany

[73] Assignee: VGT Industriekeramik GmbH, Grossalmerode, Germany

[21] Appl. No.: 25,086

[22] Filed: Mar. 2, 1993

[30] Foreign Application Priority Data

Mar. 4, 1992 [DE] Germany ............ 42 06 734.0

[51] Int. Cl.$^6$ ............ C04B 35/14; C04B 35/44
[52] U.S. Cl. ............ 501/127; 501/130; 501/133
[58] Field of Search ............ 501/127, 130, 80, 133

[56] References Cited

U.S. PATENT DOCUMENTS 3,348,597 10/1967 Chaklader et al. ............ 501/127

FOREIGN PATENT DOCUMENTS

4013294A1 11/1991 Germany .
1106430 10/1984 Japan .

OTHER PUBLICATIONS

H. Leupold, K. Santowski, K. Wieland, "Improvement of Resistance to Alkali Attack of Refractory Materials . . .", Nov. 1984.

Primary Examiner—Mark L. Bell
Assistant Examiner—David Sample
Attorney, Agent, or Firm—Hopkins & Thomas

[57] ABSTRACT

A superduty fireclay refractory brick with at least 33 to 43 per cent by weight $Al_2O_3$ and 1 to 3 per cent by weight alkali oxide for use as a large-format bottom block in a solder plating bath in furnaces for manufacturing flat glass according to the float technique has a compressive strength of 35 to 60 $N/mm^2$ and a gas permeability of less than 4 nPm. The brick possesses an open porosity of approx. 20 to 25 per cent by volume, a gas permeability of less than 3 nPm, preferably 0.5 to 2 nPm, and a hydrogen diffusion of less than 150 mm $H_2O$, preferably 30 to 100 mm $H_2O$.

9 Claims, No Drawings

SUPERDUTY FIRECLAY REFRACTORY BRICK AND METHODS FOR ITS MANUFACTURE

FIELD OF THE INVENTION

The invention refers to a superduty fireclay refractory brick with at least 33 to 43 per cent by weight $Al_2O_3$ and 1 to 3 per cent by weight alkali oxide for use as a large-format bottom block in a tin bath in furnaces for manufacturing flat glass according to the float technique. The superduty fireclay refractory brick has a compressive strength of 35 to 60 $N/mm^2$, an elasticity of compression modulus of 3000 to 10 000 $N/mm^2$ and a gas permeability of less than 4 nPm. It is a large-format refractory brick which is used for lining a tin bath in the manufacture of flat glass. A large-format brick is understood to be, for example, a brick having the dimensions $300 \times 600 \times 900$ mm.

BACKGROUND OF THE INVENTION

A superduty fireclay refractory brick with 33 to 43 per cent by weight $Al_2O_3$ and 1 to 3 per cent by weight alkali oxide for use as a large-format bottom block in a tin bath in the manufacture of flat glass is known from DE-OS 40 13 294. In that case, for improving the properties, in particular the alkali resistance, the gas permeability and the mechanical resistance, a brick is proposed which has an open porosity of 16 to 20 per cent by volume, a compressive strength of 35 to 60 $N/mm^2$, an elasticity of compression modulus of 3000 to 10 000 $N/mm^2$, a refractoriness under load (RUL) ta value of 1300° to 1450° C. and a maximum gas permeability of 4 nPm. This brick is based on the knowledge that a low gas permeability is essential for reduced alkali attack. The range of the proposed gas permeability is certainly taken as very wide. Despite this, there still remain doubts in the mind of the specialist as to whether a gas permeability of less than 4 nPm can be achieved with the characteristics stated in DE-OS 40 13 294. In this document the gas permeability is looked at in conjunction with the open porosity. With an open porosity of between 16 and 20 per cent by volume, a low gas permeability also becomes apparent. Raising the firing temperature also leads to a lowering of the porosity. On the other hand, a low porosity, in the order of magnitude of 16 per cent by volume, results in a brittle brick which is not very elastic. However, it seems doubtful whether this knowledge about the properties gained from small-format bricks can be applied to large-format bricks. A simple test size, which provides a guide to the alkali resistance, is demonstrated with the gas permeability or air permeability respectively. The RUL, also described as important, seems to be rather less significant. In contrast, nothing is mentioned about hydrogen permeability.

However, it is known that in such furnaces for the manufacture of flat glass according to the float technique, a tin bath is used, upon which the molten glass is transported. The furnace is closed from outside and placed under a reducing $N_2$ atmosphere containing $H_2$. Interactions take place between the glass bath, the tin bath and the superduty fireclay refractory bottom brick. Alkali from the glass precipitates at the surface of the superduty fireclay refractory bricks and soaks into these more or less deeply. A change in the mineral phases occurs, linked with differing coefficients of thermal expansion. Therefore, even with low temperature differences, layers of the superduty fireclay refractory bricks spall off which float up through the tin bath and contaminate the underside of the band of glass. On the other hand, hydrogen from the furnace atmosphere diffuses right through the superduty fireclay refractory brick and is conveyed upwards through the tin bath so that bubbles form on the underside of the band of glass. This transport also encourages the removal of alkali glass from the surface of the superduty fireclay refractory brick. All this interferes with the continuous manufacture of flat glass and leads to a reduction in quality. This leads to a concentration of tin in various valency stages on glass surface on the tin side. In the first instance here, the liquid tin reacts with the sulphate of the glass. The more hydrogen dissolved in the tin, the stronger this reaction.

DETAILED DESCRIPTION OF THE INVENTION

It is the object of the invention to provide a large-format superduty fireclay refractory brick of the aforementioned type which, on the one hand, has improved properties with respect to the alkali resistance in conjunction with the mechanical properties and whereby, on the other hand, the formation of hydrogen bubbles on the underside of the band of glass is minimized.

According to the invention, this is achieved with the superduty fireclay refractory brick of the aforementioned type in that the brick has an open porosity of approx. 20 to 25 per cent by volume, a gas permeability of less than 3 nPm, preferably 0.5 to 2 nPm, and a hydrogen diffusion of less than 150 mm $H_2O$ preferably 30 to 100 mm H.

The invention is based on the knowledge that a low porosity does not automatically mean a low gas permeability and a high alkali resistance. Certainly, a greater porosity than is the case with the state-of-the-art is recommended, whereby care should be taken to reduce the gas permeability by other measures. Regarding the gas permeability, it is, however, not sufficient to specify a very large range; on the contrary, a comparatively smaller range is shown here. However, it is conceivable that a reduction of, for example, from 4 nPm to 3 nPm means a significant reduction in the gas permeability. That represents a clear reduction in the gas permeability for the bottom bricks of solder plating baths. Surprisingly, the alkali resistance improves considerably if the gas permeability drops from 4 to 3 nPm; with a reduction of from 10 to 8 nPm, the improvement in the alkali resistance is very much less.

According to further knowledge, the gas permeability or the air permeability respectively says little about the hydrogen permeability of such a superduty fireclay refractory brick. On the contrary, with a low air permeability, a high hydrogen permeability seems to be the case and vice versa. Keeping both values low is what matters.

The comparative tolerance of a greater open porosity in comparison to the state-of-the-art results, advantageously, in a brick which is more elastic and even less sensitive to thermomechanical stresses. Fewer pieces of brick spall off (floaters) and there is less spoiling of the glass. There are also less pieces of brick floating to the surface.

The improved alkali resistance also means that less alkali is dispersed in the surface of the brick, whereby the alkali is deposited more on the surface of the brick and does not soak further into the brick. This is especially the case if the brick is manufactured with a gas permeability of between 1 and 2 nPm.

The advantageously lower hydrogen diffusion reduces the formation of bubbles on the underside of the band of glass. Further, the transport mechanism for reduction products is restricted. The reduced hydrogen diffusion leads to the fact that less reducible chemical components ($SiO_2$, $Na_2O$, $Fe_2O_3$) are reduced and hence less are transported to the surface of the brick too. Finally, there are fewer occurences of alkali glass detaching from the surface of the bricks.

Advantageously, the superduty fireclay refractory brick exhibits an X-ray amorphous component of 10 to 30 per cent by weight, preferably 20 to 25 per cent by weight. This means that a better elasticity of microstructure is achieved and thus a higher resistance against thermomechanical stresses.

Further, the brick can have an ultrasonic velocity of 2000 to 4000, preferably approx. 2800 to 3800, in particular approx. 3300 to 3600 m/s. The ultrasonic velocity should not be too low, but on the other hand not too high. It represents a measure for the sintering, whereby a low ultrasonic velocity reflects a impaired strength, while an ultrasonic velocity which is too high points to a high glass component linked with low elasticity.

The method for manufacturing such a superduty fireclay refractory brick provides for a mixture of
chamotte with a grain size of 0 to 5 mm,
clay, rich in silic acid, incombustible and with a quartz component >50% with respect to the clay component, and
a maximum particle size of the quartz of 50μ,
a fine particle, incombustible clay with a total alkali component of up to 3%,
an alkali-aluminosilicate and a binding agent
to be mixed, moulded into large-format bricks, dried and fired. This mixture leads to a superduty fireclay refractory brick which combines the low gas permeability with the low hydrogen diffusion. Surprisingly, an increased open porosity does not cause any disadvantages here. The increased open porosity tends to have a positive influence on the elasticity.

One part of the chamotte may be replaced by a natural alumosilicate. A further drop in the hydrogen diffusion is thereby achieved.

Fine particle C-glass with a grain size <60μ may be used as an alkali-aluminosilicate. A less expensive raw material can thereby be meaningfully used.

The bricks can be fired at temperatures of 1200° to 1350° C., whereby the maximum firing temperature is maintained over a period of at least 5 h. A consistent distribution of the physical properties right through the brick is thereby achieved, something which has a positive effect on the elasticity and the gas permeability.

The mixture can be set to a mould humidity of 4 to 7%, preferably 5.5 to 6.5%. Different shaping methods, such as presses, stamps or similar, can be considered.

A part of the mould humidity can be introduced into the mixture in the form of slips; in this way the finest components in the mixture are contained in here.

The invention will be further described and explained by means of three examples which are presented in the following table.

|  | 1 | 2 | 3 |
| --- | --- | --- | --- |
| Chamotte 0–0.5 | 19 | 29 | 29 |
| Chamotte 0.5–5 | 40 | 45 | 45 |
| Clay, rich in $SiO_2$ | 10 | 15 | 7 |
| Clay, rich in alkali | 10 | 5 | 13 |
| Alkali-aluminosilicate | 4 | 5 | 5 |
| Nat. aluminosilicate | 16 | — | — |
| Binding agent | 1 | 1 | 1 |
| Humidity | 6.3 | 6 | 6.5 |
| Firing temp. °C. | 1310 | 1300 | 1300 |
| Raw unit weight g/m$^3$ | 2.18 | 2.12 | 2.08 |
| Open poros. % by vol. | 19.7 | 22.1 | 24.3 |
| Gas permeability nPm | 1.2 | 2.05 | 2.8 |
| $H_2$ diffusion mm $H_2O$ | 65 | 95 | 70 |
| Cold crush. str. nPM | 58 | 47 | 42 |
| Young's modulus kN | 9.8 | 7.2 | 5.3 |
| Glass phase comp. % | 20 | 22 | 23 |
| Ultrasonic vel. m/s | 3700 | 3500 | 3200 |
| $SiO_2$ % by weight | 53 | 56.1 | 55.3 |
| $Al_2O_3$ % by weight | 42.7 | 39.3 | 40.5 |
| $Na_2O$ % by weight | 1.1 | 1.221 | 1.35 |
| $K_2O$ % by weight | 1.1 | 1.221 | 1.35 |

Particularly remarkable in Example 1 is the fact that through the addition of alumosilicate, which replaces a considerable part of the fine-particle chamotte, the combination of low gas permeability with low hydrogen diffusion is achieved in a surprising way. Apart from that, embodiment example 1 exhibits a particularly low glass phase component; this is due to the fact that the composition components produce, in total, a low alkali component.

A comparatively high open porosity is characteristic of both examples 2 and 3. Despite this and surprisingly, a lower gas permeability than the state-of-the-art is the outcome. Lower values for the hydrogen diffusion are produced.

I claim:

1. Superduty fireclay refractory brick with 33 to 43 percent by weight $Al_2O_3$ and 1 to 3 percent by weight alkali oxide and the remainder comprised substantially of $SiO_2$ for use as a large-format bottom block in a tin bath in furnaces for manufacturing flat glass according to the float technique, having a compressive strength of 35 to 65 N/mm$^2$ the improvement comprising: the brick has an open porosity of approximately 20 to 25 percent by volume, a gas permeability of less than 3 nPm and a hydrogen diffusion of less than 150 mm $H_2O$.

2. The superduty fireclay refractory brick according to claim 1, wherein said brick has an X-ray amorphous component of 10 to 30 percent by weight.

3. The superduty fireclay refractory brick according to claim 1, wherein said brick has an ultrasonic velocity of 2000 to 4000 m/s.

4. A method for manufacturing the superduty fireclay refractory brick of claim 1 comprising:
mixing a mixture of chamotte with a grain size of 0 to 5 mm; clay, rich in silicic acid, incombustible and with a quartz component greater than fifty percent with respect to the clay component, and a maximum particle size of the quartz of 50 μm; a fine particle incombustible clay with a total alkali component of less than or equal to 3%; an alkali-aluminosilicate; and a binding agent;
molding said mixture into large-format brick; and
drying and firing said molded mixture at temperatures of 1200° to 1350° C. over a period of at least five hours.

5. The method according to claim 4, wherein, said mixture further comprises a natural aluminosilicate.

6. The method according to claim 4, wherein a fine particle C-glass with a grain size of less than 60 μm is used as said alkalialuminosilicate.

7. The method according to claim 4, wherein the mixture is set to a mold moisture of 4 to 7%.

8. The method according to claim 7, wherein one part of the mold moisture can be introduced into the mixture in the form of slips containing the finest components of the mixture.

9. A superduty fireclay refractory brick made of 33 to 43 percent by weight $Al_2O_3$ and 1 to 3 percent by weight of alkali oxide and the remainder comprised substantially of $SiO_2$ for use as a large-format bottom block in a tin bath in furnaces for manufacturing flat glass, having a compressive strength of 35 to 60 $N/mm^2$, an elasticity of compression modulous of 3000 to 10,000 $N/mm^2$, the improvement comprising:

said brick having an open porosity of from 20 to 25 percent by volume, a gas permeability of less than 3 nPm and a hydrogen diffusion of less than 150 mm $H_2O$.

* * * * *